United States Patent [19]

Chandler

[11] Patent Number: 5,392,874
[45] Date of Patent: Feb. 28, 1995

[54] POWER ASSISTED STEERING MECHANISM

[75] Inventor: Kenneth Chandler, Reading, England

[73] Assignee: Adwest Engineering Limited, Reading, England

[21] Appl. No.: 87,694

[22] PCT Filed: Jan. 13, 1992

[86] PCT No.: PCT/GB92/00064
§ 371 Date: Dec. 28, 1993
§ 102(e) Date: Dec. 28, 1993

[87] PCT Pub. No.: WO92/12037
PCT Pub. Date: Jul. 23, 1992

[30] Foreign Application Priority Data

Jan. 14, 1991 [GB] United Kingdom ............... 9100736

[51] Int. Cl.6 ............................................. B62D 5/04
[52] U.S. Cl. ................................. 180/79.1; 73/862.332
[58] Field of Search .................... 180/79.1, 141, 142, 180/146, 147; 73/779, 847, 862.331, 862.332, 862.333, 862.334, 862.335, 862.336

[56] References Cited

U.S. PATENT DOCUMENTS 4,680,976  7/1987  Lustenberger .................. 73/862.33
4,972,727  11/1990  Yoshimura et al. ............. 73/862.335

FOREIGN PATENT DOCUMENTS

0133126A1  2/1985  European Pat. Off. .
0403234A2  12/1990  European Pat. Off. .
2608120  6/1988  France .
2097131A  10/1982  United Kingdom .
2179309A  3/1987  United Kingdom .
9212037  7/1992  WIPO .

Primary Examiner—Karin L. Tyson
Assistant Examiner—Anne Marie Boehler
Attorney, Agent, or Firm—Finnegan, Henderson, Farabow, Garrett & Dunner

[57] ABSTRACT

A power assisted steering mechanism for a vehicle, the mechanism including electrically powered drive means for driving the steering mechanism, the drive means including a drive shaft having an input shaft portion drivingly connected to an output shaft portion by resilient means such that rotation of the input shaft portion causes relative rotational displacement between the input shaft portion and the output shaft portion in dependence on the load applied to the output shaft portion, sensor means arranged to produce signals in response to the direction and amount of relative displacement between the input and output shaft portions and an electric motor for driving said output shaft in response to the signals produced by the sensor means.

12 Claims, 5 Drawing Sheets

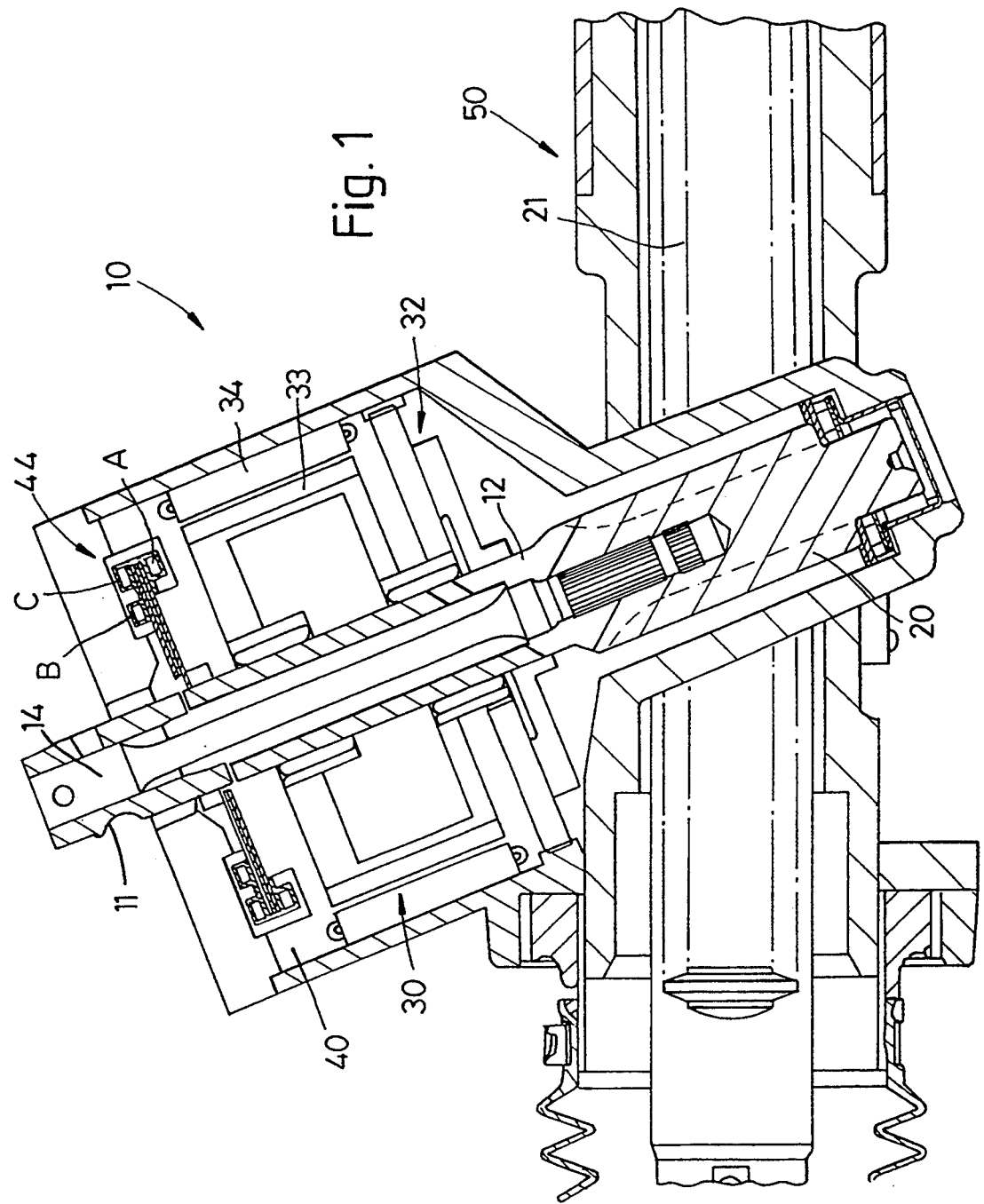

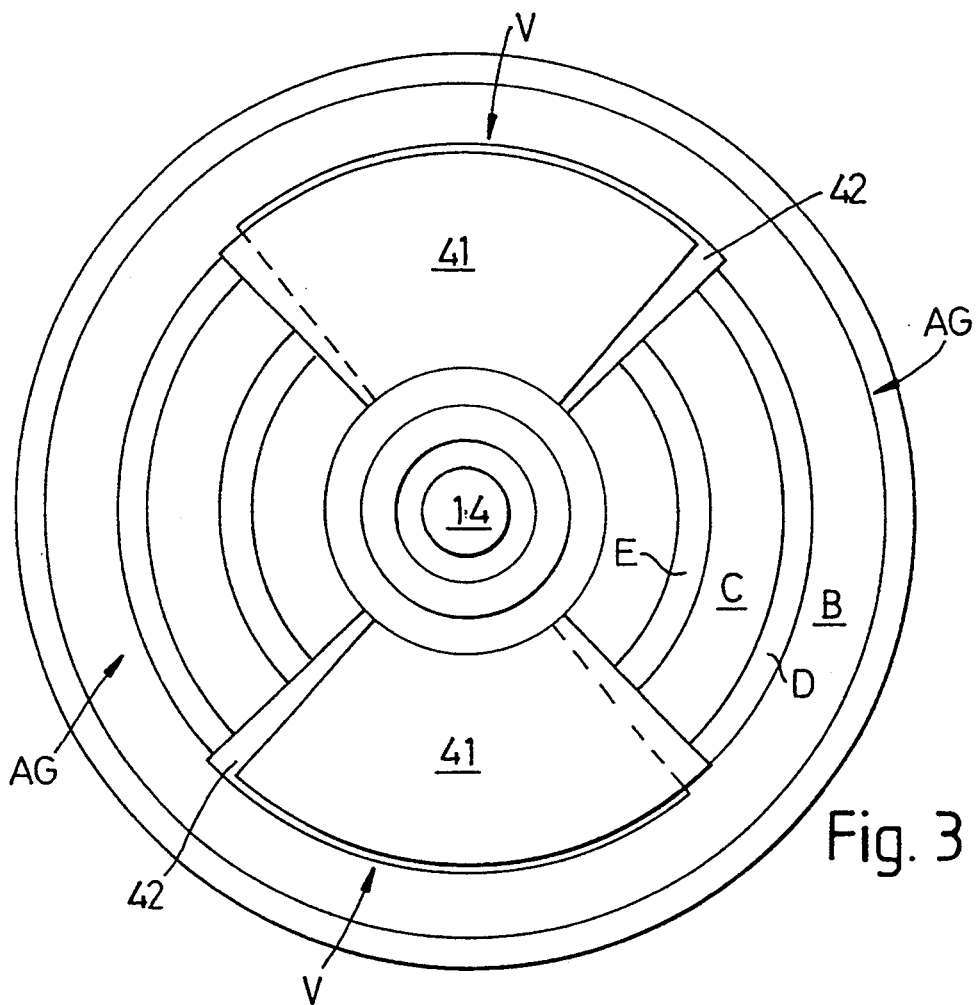
Fig. 3
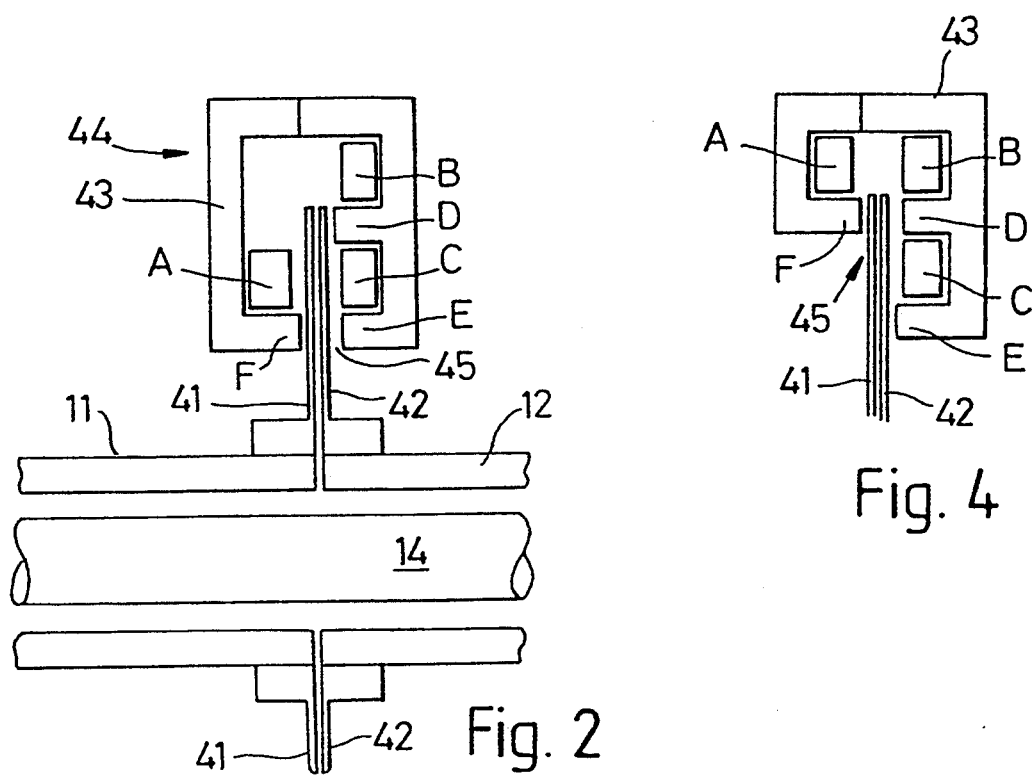
Fig. 4
Fig. 2

POWER ASSISTED STEERING MECHANISM

The present invention relates to a power assisted steering mechanism in which the power assistance is provided by electric power.

In a typical power assisted steering mechanism such as that disclosed in our UK patent 1299506 (to which reference should be made) the steering column turned by the driver is drivingly connected to a pinion which drives a rack connected to the steerable wheels. The pinion is formed on a sleeve in which there is housed a torsion bar. Relative rotation between the torsion bar and sleeve controls the degree of power assistance provided.

A problem that stops electric power assisted steering being used is the reliability of the sensing of the driver's requirement and the provision of power assistance in the required direction and to the required level of assistance.

The problem is recognised and several attempts have been made in the past to overcome it by using a multiplicity of sensors, comparing the results and releasing power assistance only if the results agree within a certain prescribed tolerance.

Using a multiplicity of sensors often requires that, at least on one of them, there is an electric coupling to the sensor in the form of a clockspring type wiring harness. If the clockspring method is not adopted then some form of contact, often in the form of slip rings, has to be made to the sensor and this introduces friction into the input to the gear. Friction at this point of a steering system is not a good thing as this can introduce instability to a power steered application.

Other sensors using LVDT devices require sliding contacts to be made to the input of the gear to translate steering torque to the linear movement that such devices require.

Other methods of overcoming the dual sensor requirement involve such organising signals that ensure that the power assistance is only permitted to be available if the speed is below a very low threshold. This threshold is such that power assistance, if wrong values are released into the steering system, presents no danger to the driver or any other road user.

According to the present invention there is provided a power assisted steering mechanism for a vehicle, the mechanism including electrically powered drive means for driving the steering mechanism, the drive means including a drive shaft having an input shaft portion drivingly connected to an output shaft portion by resilient means such that rotation of the input shaft portion causes relative rotational displacement between the input shaft portion and the output shaft portion in dependence on the load applied to the output shaft portion, sensor means arranged to produce signals in response to the direction and amount of relative displacement between the input and output shaft portions and an electric motor for driving said output shaft in response to the signals produced by the sensor means, the sensor means comprises a magnetic inductance sensor including an annular core formed of a magnetic material which is arranged to be co-axial with the input and output shaft portions, the core having an annular air gap to define opposed sets of poles on opposite sides of the air gap, a magnetic generating coil operable to generate flow of magnetic flux through the core and between the opposed sets of poles, one of the sets of poles including at least two concentric sensor poles having associated inductance coils for sensing flow of magnetic flux through the associated sensor pole, and a pair of groups of radially extending vanes located within said annular air gap, one group of vanes being mounted on the output shaft portion and the other groups of vanes being mounted on the input shaft portion, the vanes being made of a magnetic material and serving to conduct magnetic flux between the opposed sets of poles, the vanes of one group being axially spaced from the vanes of the other group and being arranged such that on movement of the input shaft portion relative to the output shaft portion consequential relative movement of the groups of vanes causes the impedance across the air gap to alter and cause a greater or lesser amount of the magnetic flux to flow through one or other of the sensor poles.

Various aspects of the present invention are hereinafter described with reference to the accompanying drawings in which:

FIG. 1 shows a steering system according to the present invention;

FIGS. 2 and 3 are schematic side and end views of a noncontacting sensor according to the present invention;

FIG. 4 is a part view similar to FIG. 2 of an alternative sensor according to the present invention;

Figure 5:
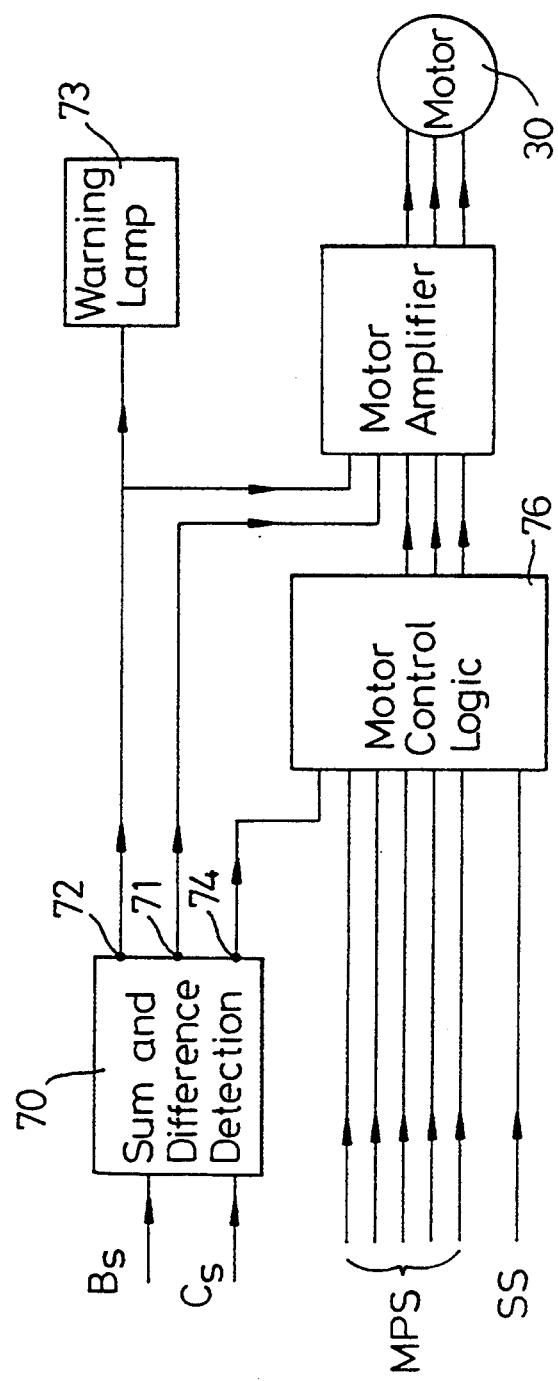
FIG. 5 shows the electronic control block diagram according to the present invention.

The power assisted steering mechanism 10 according to the present invention includes a drive shaft having a hollow input shaft 11 coupled to a hollow output shaft 12 via a torsion bar 14. The output shaft 12 includes a pinion 20 which drivingly engages a rack 21 of a steering mechanism 50.

The input shaft 11 is drivingly connected to the steering column (not shown) of the vehicle and on rotation rotates the pinion 20. In driving the pinion 20 it will be appreciated that shafts 11 and 12 will be rotationally displaced relative to one another depending upon the amount of torque required to rotate the pinion.

A sensor system 40 is provided to detect this relative movement to control a drive motor 30 which is drivingly connected to the output shaft 12 via an epicyclic gear arrangement 32. The drive motor 30 is preferably a brushless DC motor and includes a rotor 33 surrounded by a stator 34.

The epicyclic gearbox allows the torque from the motor to be amplified to a level suitable for the power assistance application. The gearbox also allows the motor to be of a smaller physical size than would otherwise be possible and allows the motor to run at a more efficient speed. The potential problems associated with the increased inertia brought on by using a gearbox are kept to a minimum by the use of light and low inertia materials for the motor and gearbox components.

The sensor system 40 includes a first set of vanes 41 attached to the input shaft 11 and a second set of vanes 42 which is attached to the output shaft 12 and so is directly connected to the pinion 20. There is preferably provided a set of interdigitating dogs (not shown) between the facing ends of shafts 11 and 12 allowing only the few degrees of relative movement necessary for the correct operation of the sensor. The interdigitating dogs are required for safety reasons to limit the torsion bar wind up to acceptable amounts and enable steerage in the event of power failure.

The sensor 40 further includes a magnetic inductance sensor or torque cell 44 which consists of a system of electrical coils mounted in a core assembly 43 formed from a magnetic material such as iron laminations or produced in the correct shape as a ferrite core. The core assembly 43 includes an annular air gap 45 in which a pair of groups of iron or steel vanes 41,42 are located. The vanes may be made of any magnetic material. Located on opposite sides of the air gap 45 are opposed sets of annular poles E,D; and F.

The vanes are arranged to overlap each other in such a way that in the unstrained, neutral condition of the torsion bar 14 there is an equal angle of vane and airspace or window present in the core assembly between the opposed sets of poles E,D; and F. This is shown schematically in FIG. 3 wherein the area occupied by the vanes is indicated by V and that occupied by the air space is indicated by AG.

When the torsion bar is strained in one direction the proportion of vane present in the air gap 45 of the coil assembly becomes greater and when the torsion bar is strained in the other direction the proportion of vane in the air gap of the coil assembly becomes less.

The assembly consists of three coils one driver coil A and two concentric sensor or detector coils B, C. When the driver coil A is energised with a suitable frequency of oscillation magnetic flux flows across the air gap between the opposed sets of poles D,E; and F and magnetic coupling to the two detector coils depends on the proportion of vane that is present in the air gap 45 of the assembly. The signal detected by one of the coils will increase as the proportion of vane in the coil assembly increases and the signal detected by the second coil will reduce. In the same way the signal on the second coil will increase if the proportion of vane decreases and the signal on the first detector coil will decrease.

Thus each of the two signals can be used to test the correctness of the other and safe decisions made about when to release power to the steering system.

As the coils and vanes are mounted so that they form a completely circular assembly the same information will be obtained from the detector coils whatever the rotational position of the vanes. Thus a dynamic torque sensing capability is possible without making mechanical or electrical connection to any of the moving parts.

Two methods of generating these mutually self checking signals are shown in FIGS. 2 and 4. In FIG. 2 pole F is located co-axially with pole E and is substantially of the same diameter: in FIG. 4 pole F is located co-axially with pole D and is substantially of the same diameter. Coil A is the driver coil that is run at a constant sinusoidal frequency at fixed maximum current. Coils B and C are the detector coils and they generate signals in proportion to the magnetic flux in the poles or arms D and E respectively of the magnetic coupling circuit.

Running coil A at constant amplitude makes the total magnetic flux in the circuit constant also. When the vanes show more of their surface to pole D of the magnetic circuit, due to relative displacement of the input and output shafts in the appropriate direction, more flux will flow through the pole D and through the vanes. Therefore, the signal generated by coil B will increase.

The reduced flux going towards pole E will result in a reduced signal coupled into coil C.

Similarly when torque is applied in the opposite direction the vanes close on each other such that they overlap more causing the magnetic circuit to reduce the flux to pole D and thus reduce the signal in coil B. The signal from coil C will increase due to the increased flux in arm E of the magnetic circuit.

Thus the signals that are generated are able to be used to test the integrity of each other and therefore the power can be released in a safe manner to the motor to provide the desired level of power assistance to the steering mechanism.

The vane segments can be made of different proportions so that the signal sizes can be made approximately the same at the neutral, i.e. untorqued, condition of the sensor. The exact shape and size will depend on the overall magnetic characteristics of the sensor assembly.

Figure 6:
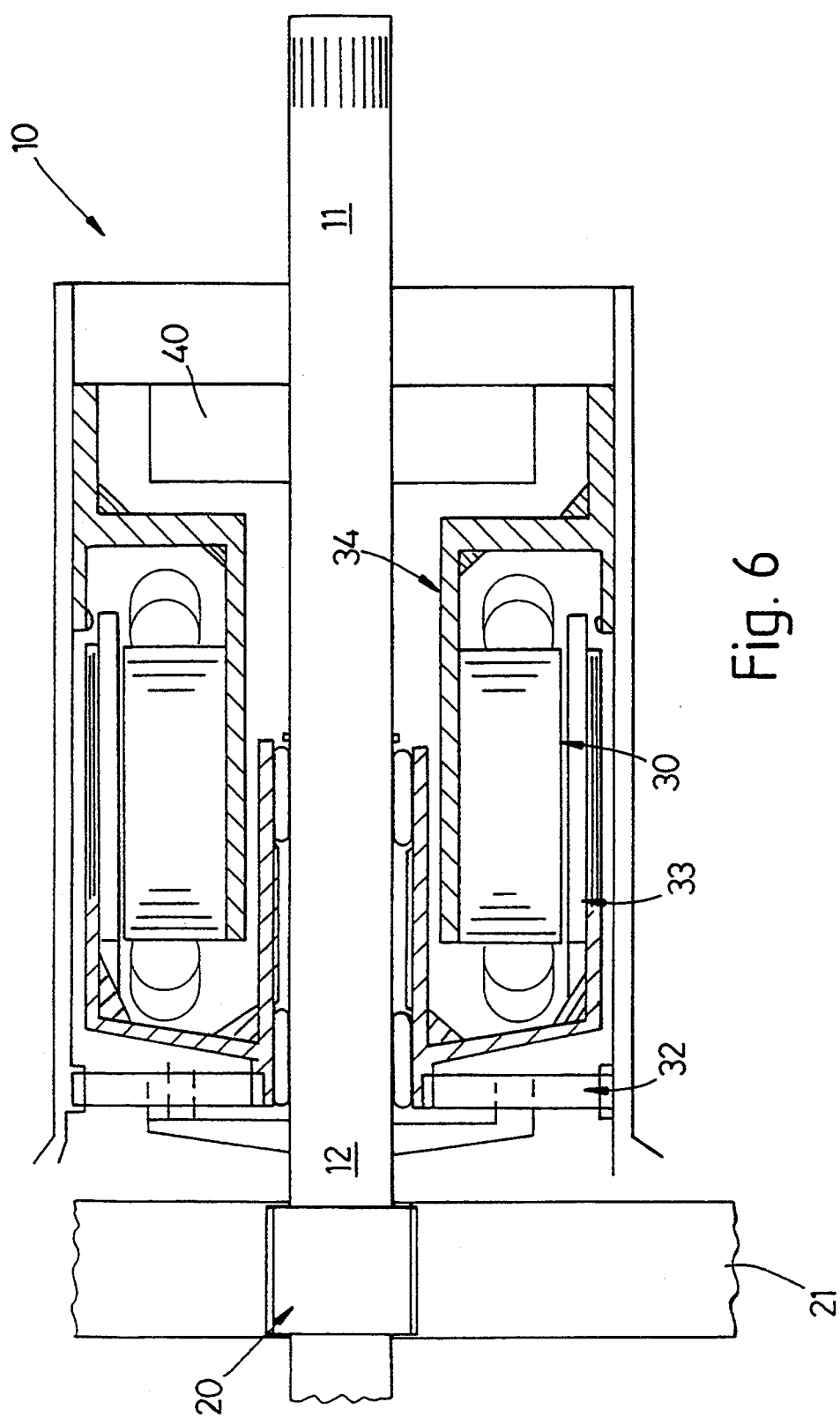
FIG. 6 is a view similar to FIG. 1 showing an alternative embodiment.

A second embodiment is illustrated in FIGS. 6–9 wherein similar parts have been designated with the same reference numbers. In the embodiment of FIG. 6 the position of the rotor 33 and stator 34 have been reversed such that the rotor 33 is of cup-like form and surrounds the stator 34. This results in an improved torque output from the motor due to a greater distance of the rotor from the central axis of rotation. A preferred arrangement in the motor stator has between 8 to 12 poles and sensors situated which detect the position of the rotor.

Figure 7:
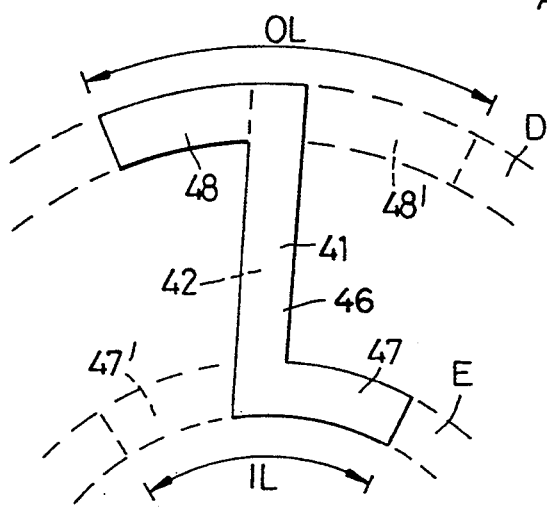
FIGS. 7 to 9 illustrate co-operating vanes at different positions of operation.
Figure 8:
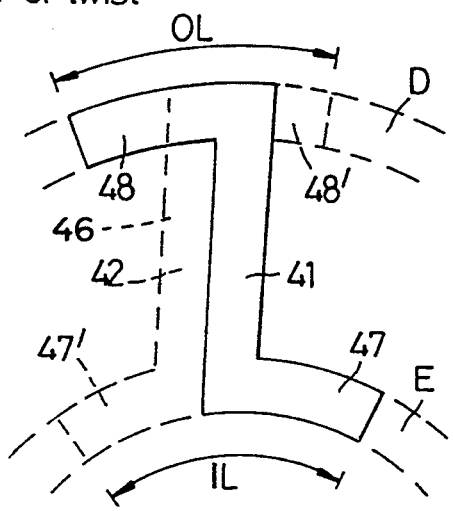
Figure 9:
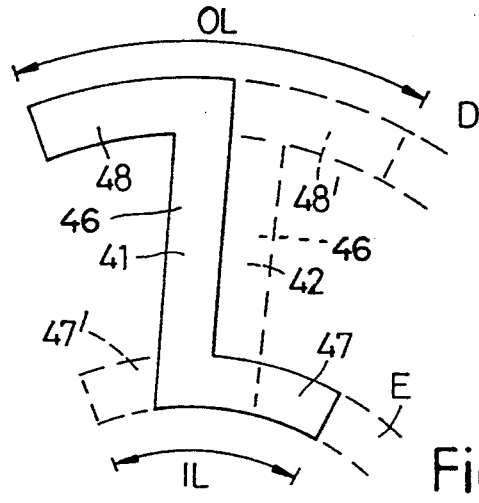

A preferred shape of vanes is illustrated in FIGS. 7 to 9 wherein the vanes in one set 41 are each generally "Z" shaped and the vanes in the other set 42 are each generally "S" shaped. Accordingly each vane of each set have a generally radially extending central portion 46 and opposed inner and outer circumferentially extending arm portions 47,48 respectively which extend in opposite directions. The arm portions 47',48' of vanes in set 42 extend in the opposite direction to arm portions 47,48 of vanes in set 41. The circumferential arm portions overlap the respective poles. 47,47' are arranged to overlie pole E and arm portions 48,48' are arranged to overlie pole D. The vanes are made from a material having low magnetic impedance, for example either steel or iron, such that their impedance to magnetic flux is low allowing for good conduction of the magnetic flux.

A neutral condition is illustrated in FIG. 7 wherein outer arm portions 48,48' collectively have an effective length of OL and inner arm portions 47,47' collectively have an effective length of IL.

When the torsion bar is strained in one direction the effective lengths OL,IL alter such that the proportion of vane covering one of the detector pole faces (either E or D) becomes greater whilst the proportion of vane covering the other pole face (D or E) becomes correspondingly less. This is shown schematically in FIG. 8 wherein vanes of set 41 have moved clockwise relative to vanes of set 42.

Accordingly the effective length OL reduces and the effective length IL increases. Thus transmission of flux through pole D decreases and through pole E increases. In FIG. 9 the set of vanes 41 have moved anticlockwise relative to vanes 42 so that the effective length OL increases and the effective length IL decreases. In FIGS. 8 and 9 a maximum deflection between the input and output shafts is shown and it is preferred that the number of vanes in each group is chosen such that in their maximum deflection a substantially continuous ring of metal is provided to overlie pole E or D.

The system is arranged such that accordingly on angular displacement in either direction a positive or negative change in the direction of flux flowing through either pole E or D is created depending upon the direction of the angular displacement and thereby provides a bigger differential in signals provided by coils B and C.

Figure 10:
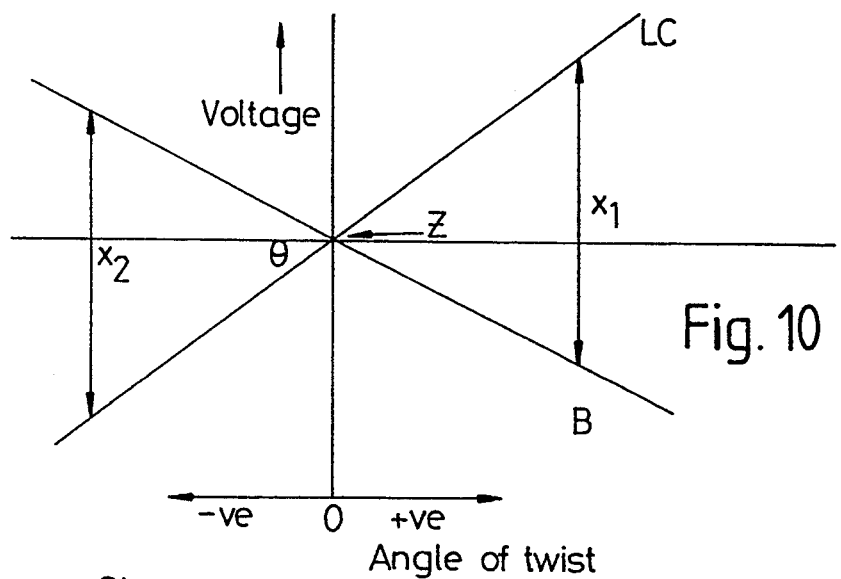
FIG. 10 is a diagrammatic graph illustrating voltage output vis angular displacement of the vanes.

Preferably the system is arranged so that a linear voltage with respect to relative angular displacement of the input and output shafts is derived from each detector such that one of the detectors' voltage rises as the other falls at the same rate in dependency of the angular displacement. This is shown schematically in FIG. 10 wherein voltage from coil C is represented by line C and voltage from Coil B is represented by line R. When the input and output shafts are in the neutral position (i.e. FIG. 7) both coils B,C output voltages are equal (point Z) and calibrated to be zero. As the steering system causes relative rotation between the input and output shafts relative angular displacement between the vanes occurs; if relative angular displacement is positive the voltage signal value of C will increase to a positive value and that of B will decrease to a negative value; if relative angular displacement is negative the signal value of C will decrease to a negative value and that of B will increase to a positive value.

For the purpose of detecting the amount of displacement the change in values of C and B from point Z are summed to give a value corresponding to X or $X_2$ (depending of direction of displacement) which is effectively twice the value obtained by measuring the output value of one coil alone. This therefore provides a relatively large value for a small angular displacement.

To determine the direction of displacement (and hence the desired direction of rotation for the motor) the sign of the value of either B or C is determined. Thus if B is monitored, a negative sign would indicate a positive angle of twist and a positive sign would indicate a negative angle of twist.

An electronic control diagram is illustrated in FIG. 5 to indicate how control of the motor 30 may be achieved.

The system illustrated in FIG. 5 includes a comparator 70 to which signals Bs,Cs from coils B and C are fed.

The comparator 70 sums the negative and positive values given by coils B and C and if zero renders the motor active by sending a signal via terminal 71. This demonstrates that the vanes 41,42 are correctly functioning. If the summed value is not zero the comparator 70 issues a warning signal via terminal 72 to the motor to render it inactive and also sends a signal to a warning lamp 73.

The amount of output required is also sent via terminal 71 and is determined by summing the absolute values of signals resulting from coils B and C to give a value $X_1$ or $X_2$.

The comparator 70 identifies the sign of the measured value from coil B or C and sends an appropriate signal via terminal 74 to instruct the motor control logic circuit 76 which direction to cause rotation of the motor 30. As is conventional, the circuit 76 receives signal mps from sensors in the motor 30 to determine which stator windings to excite.

Preferably a speed signal SS is received from a speed sensor attached to the vehicle so that the degree of power assistance provided by the motor 30 can be varied dependent upon the speed of the vehicle.

It will be appreciated that the power assisted mechanism of the present invention may be used in any application where power assistance is required for rotating a shaft.

I claim:

1. A power assisted steering mechanism for a vehicle, the mechanism including electrically powered drive means for driving the steering mechanism, the drive means including a drive shaft having an input shaft portion drivingly connected to an output shaft portion by resilient means such that rotation of the input shaft portion causes relative rotational displacement between the input shaft portion and the output shaft portion in dependence on the load applied to the output shaft portion, sensor means arranged to produce signals in response to the direction and amount of relative displacement between the input and output shaft portions and an electric motor for driving said output shaft in response to the signals produced by the sensor means, the sensor means comprises a magnetic inductance sensor including an annular core formed of a magnetic material which is arranged to be co-axial with the input and output shaft portions, the core having an annular air gap to define opposed sets of poles on opposite sides of the air gap, a magnetic generating coil operable to generate flow of magnetic flux through the core and between the opposed sets of poles, one of the sets of poles including at least two concentric sensor poles having associated inductance coils for sensing flow of magnetic flux through the associated sensor pole, and a pair of groups of radially extending vanes located within said annular air gap, one group of vanes being mounted on the output shaft portion and the other groups of vanes being mounted on the input shaft portion, the vanes being made of a magnetic material and serving to conduct magnetic flux between the opposed sets of poles, the vanes of one group being axially spaced from the vanes of the other group and being arranged such that on movement of the input shaft portion relative to the output shaft portion consequential relative movement of the groups of vanes causes the impedance across the air gap to alter and cause a greater or lesser amount of the magnetic flux to flow through one or other of the sensor poles.

2. A power assisted steering mechanism according to claim 1, wherein the electric motor includes a stator and rotor which are with co-axial with and surround the output shaft portion.

3. A power assisted steering mechanism according to claim 2 wherein the motor is a brushless motor having a stator located adjacent to the output shaft portion and a rotor surrounding the stator.

4. A power assisted steering mechanism according to claim 2, wherein the motor is a brushless motor having a rotor located adjacent to the output shaft portion and a stator surrounding the rotor.

5. A power steering mechanism according to claim 1, wherein inner and outer concentric sensor poles are provided in said one set of poles and a single annular pole is provided in the other set of poles.

6. A power steering mechanism according to claim 5 wherein said single annular pole is co-axial with and of substantially the same diameter as the inner concentric sensor pole.

7. A power steering mechanism according to claim 6 wherein said single annular pole is co-axial with and substantially the same diameter as the outer concentric sensor pole.

8. A power assisted steering mechanism according to claim 5 wherein the vanes in one group have a radially inner arm portion extending in one circumferential direction and a radially outer arm portion extending in the opposite circumferential direction and the vanes in the other group have a radially inner arm portion extending in said opposite circumferential direction and a radially outer arm portion extending in said one circumferential direction, the inner and outer arm portions of both groups of vanes being concentrically arranged to overlie respective concentric sensor poles and being arranged so that a vane of one group overlies a vane of another group such that the combined length of their inner or outer arm portions lengthens or shortens in dependence on the direction of relative rotational movement between the input and output shaft portions.

9. A power assisted steering mechanism according to claim 8 wherein the number of vanes in each group and the length of their inner and outer arm portions are chosen such that on maximum relative rotational movement between the input shaft and output shaft portions in one or other direction the inner or outer arm portions of both groups collectively substantially completely overlie one or other of the sensor poles.

10. A power assisted steering mechanism according to claim 8 or 9 wherein the vanes in one group are generally "S" shaped and the vanes in the other group are generally "Z" shaped.

11. A power assisted steering mechanism according to claim 1 wherein the electric motor drives the output shaft portion via a planetary gear transmission.

12. A power assisted steering mechanism according to claim 1 wherein the resilient means comprise a torsion bar secured at one end to the input shaft portion and secured at the other end to the output shaft portion.

* * * * *